(12) United States Patent
Becker

(10) Patent No.: US 9,322,484 B2
(45) Date of Patent: Apr. 26, 2016

(54) SAFETY FITTING

(76) Inventor: Dominic Becker, Möhnesee (DE)

( * ) Notice: Subject to any disclaimer, the term of this patent is extended or adjusted under 35 U.S.C. 154(b) by 89 days.

(21) Appl. No.: 13/884,428

(22) PCT Filed: Nov. 10, 2011

(86) PCT No.: PCT/DE2011/001961
§ 371 (c)(1),
(2), (4) Date: May 9, 2013

(87) PCT Pub. No.: WO2012/062284
PCT Pub. Date: May 18, 2012

(65) Prior Publication Data
US 2013/0220456 A1    Aug. 29, 2013

(30) Foreign Application Priority Data
Nov. 10, 2010   (DE) .................. 10 2010 050 781

(51) Int. Cl.
| | |
|---|---|
| *F16K 17/00* | (2006.01) |
| *F16K 15/02* | (2006.01) |
| *A62C 4/02* | (2006.01) |
| *F16K 17/04* | (2006.01) |
| *F16K 35/04* | (2006.01) |

(52) U.S. Cl.
CPC .............. *F16K 15/023* (2013.01); *A62C 4/02* (2013.01); *F16K 17/044* (2013.01); *F16K 35/04* (2013.01); *Y10T 137/7866* (2015.04)

(58) Field of Classification Search
CPC ..... F16K 15/023; F16K 35/04; F16K 17/044; A62C 4/02; Y10T 137/7866
USPC .......... 137/498, 456, 459, 460, 497, 516; 251/297
See application file for complete search history.

(56) References Cited

U.S. PATENT DOCUMENTS

| | | | | |
|---|---|---|---|---|
| 1,609,641 | A | * | 12/1926 | Christensen ............. 137/118.03 |
| 1,798,536 | A | * | 3/1931 | Hofmann ....................... 137/493 |
| 1,840,180 | A | * | 1/1932 | Woods ........................... 137/459 |
| 2,121,936 | A | * | 6/1938 | Rosswell ....................... 137/498 |
| 2,253,580 | A | * | 8/1941 | Rahe ............................ 303/84.2 |
| 2,408,799 | A | * | 10/1946 | Melichar ....................... 137/113 |
| 2,440,478 | A | * | 4/1948 | Kehle ............................ 137/113 |
| 2,465,606 | A | * | 3/1949 | Reynolds ....................... 128/868 |
| 2,623,725 | A | * | 12/1952 | Sands ....................... 137/516.25 |
| 2,711,186 | A | * | 6/1955 | Perez ............................ 137/460 |

(Continued)

FOREIGN PATENT DOCUMENTS

| | | |
|---|---|---|
| DE | 198 37 146 | 3/2000 |
| DE | 199 12 326 | 9/2000 |

(Continued)

OTHER PUBLICATIONS

International Search Report issued by the European Patent Office in International Application PCT/DE2011/001961 on Jun. 6, 2012.

*Primary Examiner* — John K Fristoe, Jr.
*Assistant Examiner* — Umashankar Venkatesan
(74) *Attorney, Agent, or Firm* — Henry M. Feiereisen LLC

(57) ABSTRACT

The safety fitting has a blocking body that is restrained on both sides by springs in a widened section of a housing that is provided with sealing seats. In the open position, the blocking body is held in position by at least one detent unit that acts transversely to the direction of movement of the blocking body.

13 Claims, 2 Drawing Sheets

(56) References Cited

U.S. PATENT DOCUMENTS

| | | | | |
|---|---|---|---|---|
| 2,718,236 | A | * | 9/1955 | Nowee ............................ 137/460 |
| 2,965,730 | A | * | 12/1960 | Regoli .................. B60T 11/323 |
| | | | | 137/118.06 |
| 3,085,589 | A | * | 4/1963 | Sands ............................ 137/498 |
| 3,561,471 | A | * | 2/1971 | Sands ............................ 137/498 |
| 3,683,957 | A | * | 8/1972 | Sands ............................ 137/460 |
| 5,074,134 | A | * | 12/1991 | Wheadon ........................ 70/175 |
| 7,343,927 | B2 | * | 3/2008 | Zellweger ..................... 137/460 |
| 2010/0218963 | A1 | | 9/2010 | Zellweger |

FOREIGN PATENT DOCUMENTS

| | | |
|---|---|---|
| DE | 101 41 348 A1 | 3/2002 |
| DE | 102 13 865 A1 | 10/2002 |
| GB | 1044888 | 10/1966 |
| WO | WO 2006/120091 | 11/2006 |

* cited by examiner

SAFETY FITTING

CROSS-REFERENCES TO RELATED APPLICATIONS

This application is the U.S. National Stage of International Application No. PCT/DE2011/001961, filed Nov. 10, 2011, which designated the United States and has been published as International Publication No. WO 2012/062284 A2 and which claims the priority of German Patent Application, Serial No. 10 2010 050 781.4, filed Nov. 10, 2010, pursuant to 35 U.S.C. 119(a)-(d).

BACKGROUND OF THE INVENTION

The invention relates to a safety fitting for integration into a fluid line.

Such a safety fitting is known from WO 2006/12 0091. In a widened section of a housing which is provided with sealing seats, it has a blocking body which is clamped on both sides by springs. Such safety fittings are used in fluid lines for transporting in particular gases and fine grained solid materials (dusts).

In order to protect for example, integrated filter systems against sudden pressure increases by fast blocking of the fluid lines, a safety fitting with a straight passage is used. In order to prevent or minimize loss of flow as far as possible, the blocking body is arranged quasi floatingly in the center of a flow-technically widened section of a housing which has two pipe sockets adjacent the section. This safety fitting is intended to automatically close as soon as the maximally admissible pressure or the maximal admissible flow velocity is exceeded. The centered position of the blocking body is defined by springs whose spring force is adjusted exactly to the respective theoretically calculated flow velocity. When the actual flow ratio does not match the theoretic value, the safety fitting cannot be activated properly. In this case, the blocking body and/or the springs have to be dismounted and a new spring set has to be inserted. This may significantly delay initiating operation of a safety fitting, including the overall system connected thereto. This is in particular the case, when the corresponding spring set is not available on site. The possibility for external intervention for adjusting the spring tension is not available and is also only conceivable with significant technical effort and even then only to a limited degree.

SUMMARY OF THE INVENTION

The adjustment of the spring force is likewise influenced by the weight of the blocking body with its parts which are movable on the center axis of the housing, in all mounting positions which deviate from the horizontal and up to the maximal load in the vertical.

It is thus important, to avoid changes of the center position of the blocking body even in the case of fluctuations within the admissible pressure or the admissible flow velocity which may cause these changes, in order to prevent narrowing of the flow cross-section.

The invention is based on the object, to refine a safety fitting for integration into a fluid line such that in the case of fluctuations of the pressure and/or the flow velocity within the admissible values, a problem-free positioning of the center position of the walking body can be in short without the complete dismounting of the blocking body.

According to the invention, this object is solved by safety fitting for integration into a fluid line, including a housing having a widened section and sealing seats; a blocking body arranged for movement in the widened section of the housing; springs provided on opposing sides of the blocking body in one to one correspondence and acting in opposition of the movement; and at least one latching unit including a latching member and exerting a latching force on the blocking body via the latching member in a transverse direction relative to a direction of movement of the blocking body, thereby holding the blocking body in an open position in the widened section of the housing, wherein the latching force is adjustable in a mounted position of the safety fitting from outside the safety fitting.

Advantageous refinements of the invention are the subject matter of the dependent claims.

Important for the invention is thus, that in the open position i.e., the neutral center position, the blocking body is properly positioned by at least one latching unit which acts transversely relative to the direction of movement of the blocking body and which can be adjusted from outside i.e., without having to open the fluid line. In the mounting position, a latching force which acts on the latching member of the latching unit is adjustable from outside, i.e. when access to the inside of the safety fitting is no longer possible.

As a result of this measure, the latching body is thus positioned by the latching unit in its neutral center position (open position) so long as the maximal admissible pressure or the maximum admissible flow velocity in the system is not exceeded. The latching unit properly holds the blocking body in its neutral center position. However, when the pressure or the flow velocity in the pipe system suddenly increase and seek to displace the blocking body, the holding force of the latching unit is overcome and the blocking body is no longer in the neutral position. The blocking body can be securely displaced onto one of the sealing seats for blocking the fluid line.

The holding force of the locking unit is essentially determined by the size of the safety fitting, the flow velocity (feed pressure) and by the mounting position.

In principle, one latching unit is sufficient for holding the blocking body in the open position. However, in order to avoid uneven transverse loads, two diametrically opposed latching units are provided.

In an expedient embodiment of the invention, the latching unit has a compression spring which acts on a spherical latching member, in particular a helical compression spring. A recess which is adapted to the latching member is provided on the circumference of the blocking body. This embodiment ensures a proper positioning of the blocking body within the admissible pressure and flow values. If these values are exceeded, the latching member is displaced against the return force of the compression spring so that the blocking body can be displaced into a closing position.

Expediently, the recess is formed as circumferential groove on the blocking body.

It is further advantageous that the latching member is non detachably held in an end-side chamber of a longitudinal sleeve which is fixed on the housing transverse to the direction of movement of the blocking body, which sleeve receives the adjustable compression spring in a longitudinal channel. Such a connection unit can be easily manufactured and easily and securely detachably fixed on the housing of the safety fitting.

For tensioning the compression spring and with this for determining the secured open position of the blocking body, a threaded bolt is provided which is displaceable in the longitudinal direction of the sleeve. The threaded bolt is rotatably supported on the end of the sleeve which is opposite the latching member. By rotating the threaded bolt, the compression spring is tensioned or relaxed and pushed against the latching member, which then engages in the recess on the blocking body.

The adjustable tension force of the compression spring by means of the threaded bolt is secured in that the threaded bolt can be fixed in position by means of a counter nut.

For visually displaying the tension force and adjustment scale can be provided in the region of the threaded bolt.

The latching member is preferably hardened. It should not be corroding or wear as a result of vibrations of the latching body in the flow channel. Accordingly, the latching member should have a greater hardness than the surface of the recess on the blocking body.

The secure position of the latching member on the inside of the sleeve is ensured in that the front-side opening of the chamber that receives the latching member and faces the blocking body is smaller than the diameter of the latching member. By this the latching member is not only non detachably held in the chamber, but it is also ensured, that the surface region of the latching member which extends outwardly via the opening and interacts with the recess in the blocking body is of sufficient size to ensure the desired engagement on the blocking body. The border of the opening can be configured cup point-like by flanging.

In a refinement of the invention, the blocking body is configured double conical with a central cylinder section and the sealing seats are formed on the pipe socket which extends adjacent to the widened section of the housing. Through interaction with the blocking body, this allows creating a gap sealing with flame-arresting capability. The gap width can maximally be 0.5 mm. The gap length should be at least 20 mm.

In addition, a sealing ring can either be provided on the sealing seats or on the blocking body with which the width can be essentially reduced to 0. In a correspondingly configured elastomer sealing ring a width of –0.2 mm can be achieved when gas tightness is desired. Using different sealing shapes and qualities, be it solid or inflatable, allows achieving any desired degree of sealing in the flow passage of the respective fluid.

BRIEF DESCRIPTION OF THE DRAWING

In the following, the invention is explained in more detail by way of exemplary embodiments shown in the drawing. It is shown in.

DETAILED DESCRIPTION OF PREFERRED EMBODIMENTS

Figure 1:
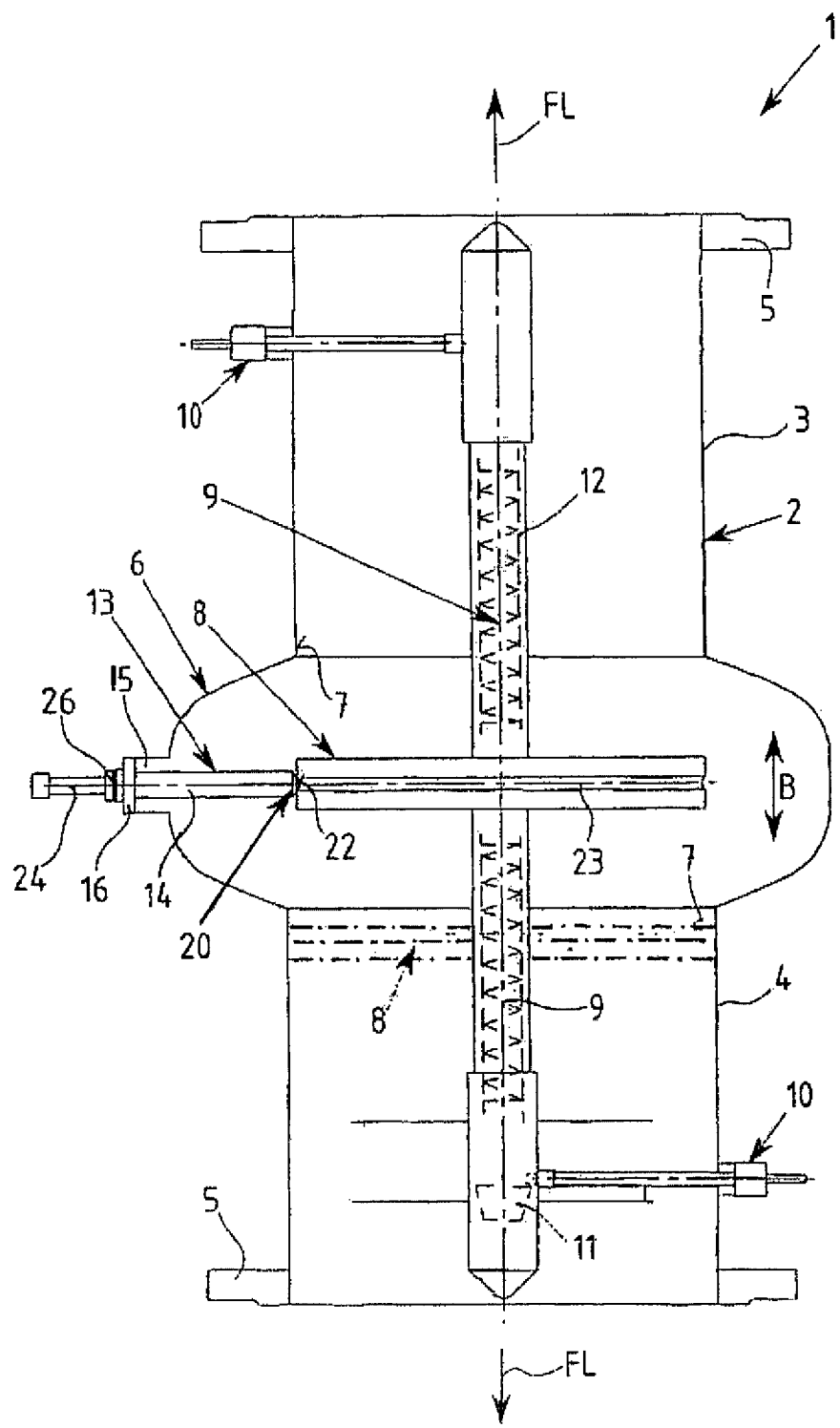
FIG. 1 a safety fitting in a schematic longitudinal section.

The safety fitting 1 of FIG. 1 is provided for integration into a fluid line which conducts fluids such as for example gases or fine grained solid materials (dusts) (indicated by the arrows FL). It has a housing 2, which includes two pipe sockets 3, 4 with end-side flanges 5 and a widened section 6 which is provided between the pipe sockets 3, 4. In the region of the transitions from the pipe sockets 3, 4 to the widened section 6, sealing seats 7 are provided.

In the longitudinal direction of the safety fitting 1 a disk shaped blocking body 8 is displaceably arranged in the widened section 6. This blocking body 8 is clamped between springs 9.

The sealing seats 7 or the blocking body 8 can be provided with not further shown sealing rings.

In the case of inadmissible increase of pressure or flow in the fluid line FL and with this also in the housing 2, the blocking body 8 is displaced in the direction of movement B adjacent one of the sealing seats 7 and secured in this position by means of fastening devices 10. These can be manually detached again. In the region of the pipe socket 4, the position of the blocking body 8 in the closed position and also the locking of a fastening device 10 with a cone 11 on a guiding rod 12 for the blocking body 8 is illustrated schematically.

Figure 2:
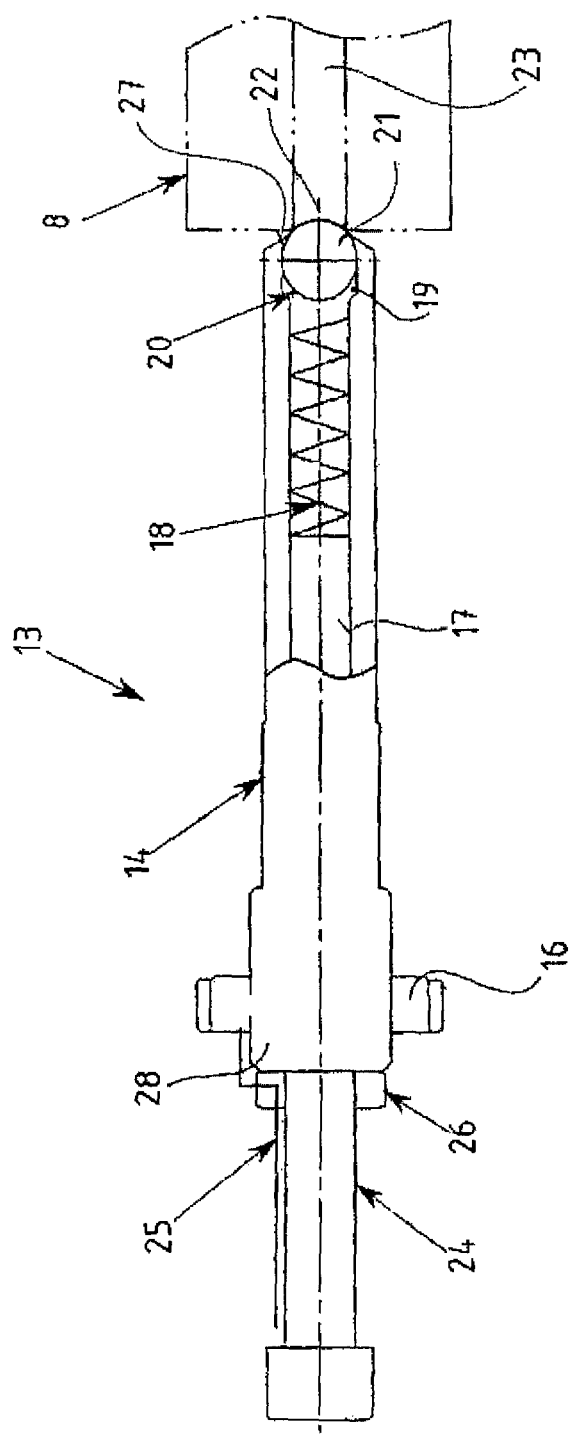
FIG. 2 in an enlarged representation of the view, partially sectioned, a latching unit which forms a component of the safety fitting.

The blocking body 8 is held in the shown neutral center position (open position of the safety fitting 1) by means of a latching unit 13 which can be seen in more detail in FIG. 2, in order to avoid displacement of the blocking body 8 and associated narrowing of the flow passage in the widened section 6 as a result of fluctuations within the admissible pressure and flow parameters.

The latching unit 13 includes a longitudinal sleeve 14, which is screwed into a protruding socket 15 (FIG. 1) on the widened section 6 and fixed by means of a nut 16. Located in this sleeve 14 is a longitudinal channel 17 in which the helical compression spring 18 is arranged. On the end 27 of the sleeve 14 which faces the blocking body 8, a chamber 19 having a widened diameter is provided for receiving a spherical latching member 20. This latching member 20 is securely held in the chamber 19 in that the opening 21 at the end 27 of the sleeve 14 is smaller than the diameter of the latching member 20. This opening 21 can be formed by forming (flanging) of the cup point like tapered end 27 of the sleeve 14. The latching member 20 nevertheless protrudes relative to the sleeve 14 with a sufficiently great surface region 22 to engage into a circumferential groove 23 of the blocking body 8.

The force of the helical compression spring 18 required for this, is adjusted by means of a threaded bolt 24 which can be screwed into the longitudinal channel 17 which is provided with a here not further shown thread on the other end 28 of the sleeve 14. The value of the spring force can be read off an adjustment scale 25. The adjusted position of the threaded bolt 24 and with this the spring force of the compression spring 18 is secured by means of a counter nut 26.

What is claimed is:

1. A safety fitting for integration into a fluid line, comprising:
   a housing having a widened section and sealing seats;
   a blocking body arranged for movement in the widened section of the housing;
   springs provided on opposing sides of the blocking body in one to one correspondence and acting in opposition of the movement; and
   at least one latching unit comprising a latching member and exerting a latching force on the blocking body via the latching member in a transverse direction relative to a direction of movement of the blocking body, thereby holding the blocking body in an open position in the widened section of the housing, wherein the latching force is adjustable in a mounted position of the safety fitting from outside the safety fitting.

2. The safety fitting of claim 1, further comprising two diametrically opposed said at least one latching unit.

3. The safety fitting of claim 2, wherein the latching member is constructed spherical, and wherein the at least one latching unit comprises a compression spring, said compression spring acting on the spherical latching member, thereby providing the latching force.

4. The safety fitting of claim 3, wherein a circumference of the blocking body is provided with a recess, said recess being constructed to correspond in shape to the spherical latching member.

5. The safety fitting of claim 4, wherein the recess is configured as circumferential groove.

6. The safety fitting of claim 3, wherein the latching unit comprises a sleeve fixed on the housing and oriented in the transverse direction, said sleeve having a longitudinal channel and an end-side chamber, wherein the latching member is held in the end-side chamber, and wherein the adjustable compression spring is received in the longitudinal channel.

7. The safety fitting of claim 3, wherein the latching member further comprises a threaded bolt displaceable in a longitudinal direction of the sleeve, for tensioning the compression spring.

8. The safety fitting of claim 7, further comprising a counter nut for fixing the threaded bolt in position.

9. The safety fitting of claim 7, further comprising an adjustment scale arranged in the region of the threaded bolt.

10. The safety fitting of claim 3, wherein the latching member is hardened.

11. The safety fitting of claim 6, wherein the end-side chamber has a front-side opening facing the blocking body, said front-side opening being smaller than a diameter of the latching member.

12. The safety fitting of claim 1, wherein the housing further comprises pipe sockets extending adjacent the widened section of the housing, wherein the sealing seats are formed on the pipe sockets.

13. The safety fitting of claim 1, wherein the sealing seats or the blocking body are provided with sealing rings.

* * * * *